No. 612,798. Patented Oct. 18, 1898.
J. A. COOPER.
ANIMAL TRAP.
(Application filed Aug. 20, 1897. Renewed Aug. 26, 1898.)
(No Model.) 2 Sheets—Sheet 1.
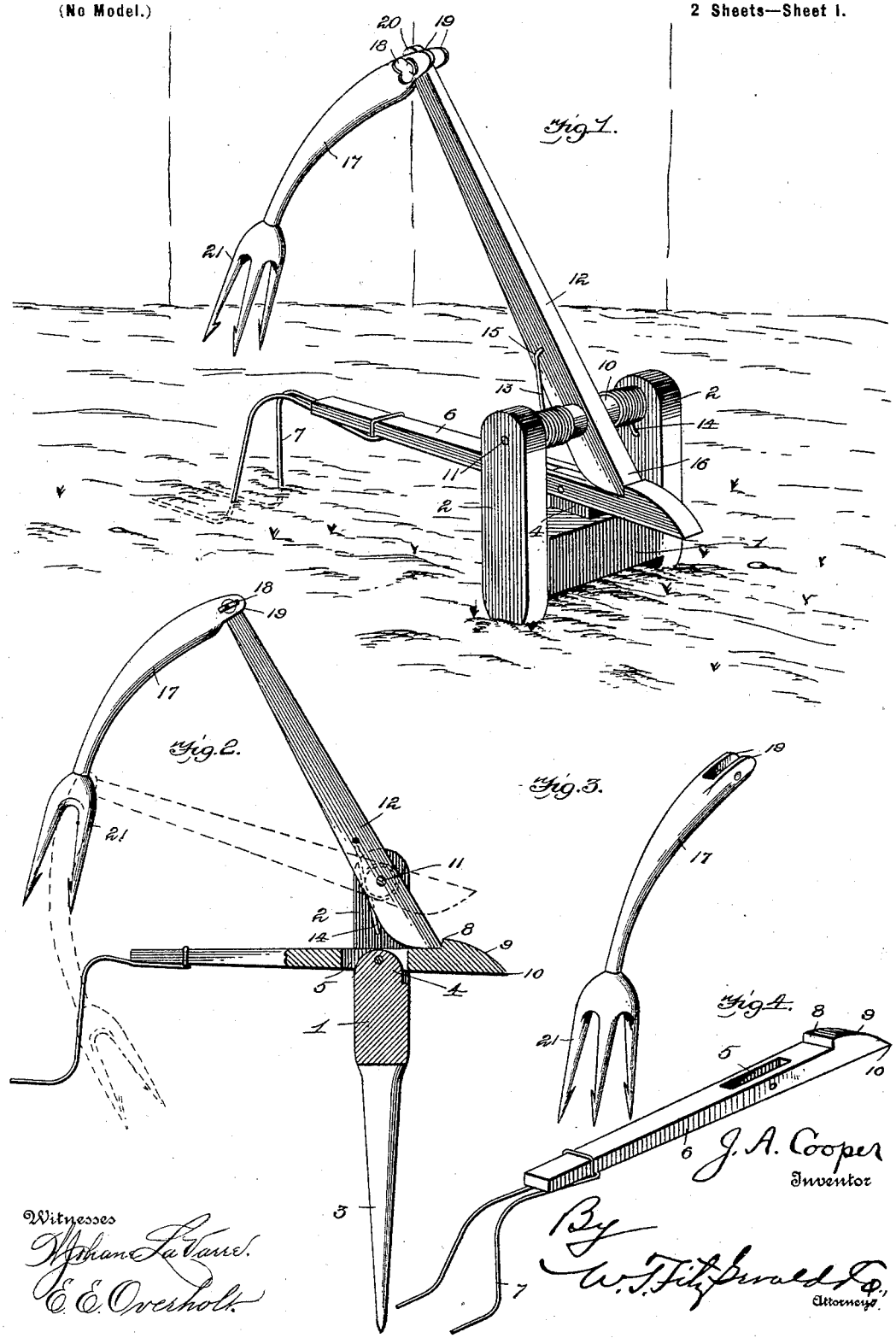

No. 612,798. Patented Oct. 18, 1898.
J. A. COOPER.
ANIMAL TRAP.
(Application filed Aug. 20, 1897. Renewed Aug. 26, 1898.)

(No Model.) 2 Sheets—Sheet 2.

J. A. Cooper
Inventor

Witnesses

UNITED STATES PATENT OFFICE.

JOHN A. COOPER, OF ADAIR, IOWA.

ANIMAL-TRAP.

SPECIFICATION forming part of Letters Patent No. 612,798, dated October 18, 1898.

Application filed August 20, 1897. Renewed August 26, 1898. Serial No. 689,617. (No model.)

*To all whom it may concern:*

Be it known that I, JOHN A. COOPER, a citizen of the United States, residing at Adair, in the county of Adair and State of Iowa, have invented certain new and useful Improvements in Animal-Traps; and I do hereby declare the following to be a full, clear, and exact description of the invention, such as will enable others skilled in the art to which it appertains to make and use the same.

The invention fully set forth in the following specification, illustrated in the accompanying drawings, and pointed out in the claims relates to certain new and useful improvements in animal-traps, and more particularly to that form of trap which has certain special adaptations which will be specifically designated.

The object of my invention is to provide an animal-trap which may be very cheaply constructed and readily applied to use.

Figure 5:
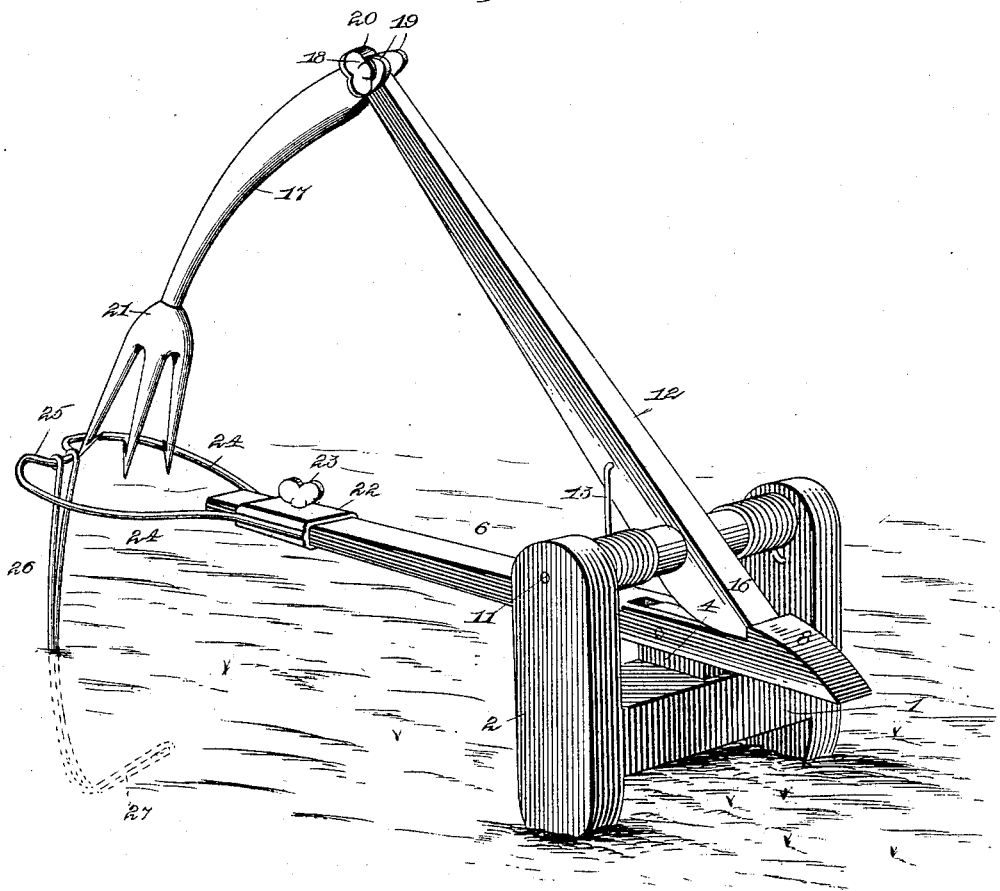
Figure 6:
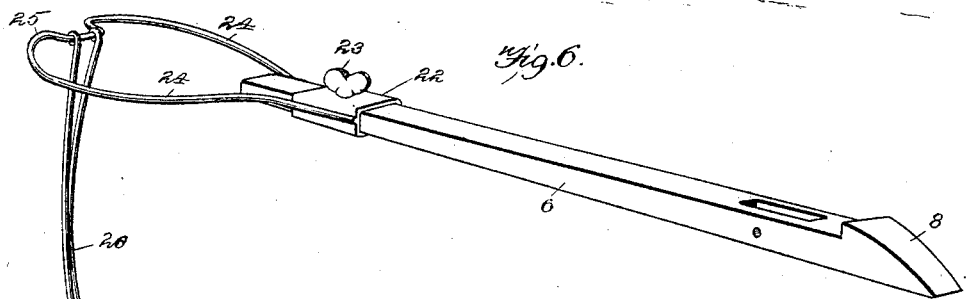

In the accompanying drawings, Figure 1 is a perspective view showing a preferred method of using my improved trap for catching moles, gophers, and animals having a similar habitat. Fig. 2 is a side elevation of the complete trap, showing the anchoring-prongs designed to be pressed into the ground. Fig. 3 is a detailed perspective view of the impaling device. Fig. 4 is a detailed perspective view of the trigger mechanism. Fig. 5 is a perspective view of trap, showing a varied form of trigger, while Fig. 6 is a detail of such trigger.

For convenience of referring to the several details involved figures will be employed, the same figure having reference to the same part in all of the views.

In materializing my invention I provide the body-section 1, connected at either end to the side standards 2, each of said standards extending downward and terminating in the anchoring-stems 3, designed to be forced into the soil where the use of the trap is desirable.

Upon the upper surface of the body-section 1, near the central part thereof, I locate the pivot-point or ear 4, designed to be received by a slotted aperture 5, provided in the actuating-lever 6, said lever carrying upon its outer end the trigger mechanism 7, consisting, for simple and cheap construction, in a wire wrapped around the end of said lever and properly secured in any preferred way. The opposite end of the lever is provided with the shoulder or offset 8 and the rounded tapered face 9.

In the upper ends of the standards 2 I mount the axle or roller 10, provided with suitable journals 11, designed to be received in suitable bearings in the upper ends of said standards, while centrally disposed upon said axle and rigidly secured thereto is the driving-lever 12, the outer free end of which is normally disposed downward by the coiled springs 13, the outer ends 14 of the springs being suitably secured to the standards, while the free ends 15 thereof are secured to the driving-lever 12.

The enlarged end 16 of the driving-lever 12 is properly beveled and is designed to engage the shoulder 8 upon the actuating-lever 6, while to the opposite end thereof I pivotally attach the impaling-arm 17, said arm being held in an adjusted position with respect to the driving-lever 12 by means of the set-screw 18, which takes through the bifurcated end 19 of said arm and through the end 20 of said driving-lever, disposed between said bifurcated end.

Secured in any preferred manner to the lower end of the impaling-arm is the multipointed spear 21, designed to engage the attention of the animal. It will be understood that any substantial equivalent for the construction which I have just described may be adopted without departing from the spirit of my invention.

In Figs. 5 and 6 I have shown a modified form of construction for the trigger mechanism, by which it will be observed that the free end of the lever constituting the trigger is provided with an adjustable sleeve 22, held at any point upon the end of said lever by the set-screw 23. Attached in any preferred way to the sides of said sleeve are the outwardly-curved arms 24, which unite to form the loop or bend 25, in which is pivotally seated the upper end of the trigger proper, 26, the latter consisting in this case of a single piece of wire bent upon itself to form the hook-section 27, which when the trap is mounted in position ready for service is buried slightly beneath the soil, so that the extreme lower end of the bend will project slightly into the burrow of the animal, and thus be in a position to be disturbed by the movements of such animal as it passes under the same, resulting in the disengagement of the trigger with the driving-lever and in the impalement of the animal thus actuating the parts.

By means of the adjusting-sleeve 22 and the adjustably-pivoted impaling-arm 27 the frame can be set at a greater or less distance from the burrow or from the spot at which it is desired to impale the animal, and thereby the proper coöperation of the parts be secured.

Having thus fully described the construction of my invention, the operation or use thereof may be stated to be as follows: When applied to use for catching moles or other burrowing animals, the anchoring-stems 3 are seated deeply in the soil in such position that one of said points will be upon either side of the hole or burrow; when the earth may be removed from the upper part of the burrow at a point immediately under the trigger 7, and the extreme lower ends of said trigger should then be forced into the soil until they extend into the burrow, when the passing animal will be engaged by said points, thus tending to raise the lever 6 out of engagement with the driving-lever 12, when by reason of the tension of the springs 13 the forward end of said lever and the parts attached thereto will be forced violently downward, thrusting the driving-spear 21 into the animal, and thus destroying the same.

It will be understood that any suitable bait may be secured to the trigger when it is desired to leave the same above the ground, thus fitting the device for use when it is desired to catch other variety of animals than those under the surface of the ground.

It will be understood that while my improved animal-trap is especially desirable and valuable for catching burrowing animals, yet it will be found reliably efficient for catching almost every species of animals, either large or small, the size of the trap being varied according to the office to which it is assigned.

Believing that the construction, operation, and advantages of my improved animal-trap have been made fully apparent from the foregoing specification, considered in connection with the accompanying drawings, further reference will be dispensed with.

What I claim as new, and desire to secure by Letters Patent, is—

1. The herein-described animal-trap consisting of the body; anchoring-stems secured thereto; an actuating-lever pivoted to said body; standards erected upon said body; a driving-lever journaled in said standards; an impaling-arm adjustably secured to the outer end of the driving-lever; a spring so disposed upon the driving-lever that it will be normally directed downward and a suitable clutch mechanism provided upon the actuating-lever and designed to coöperate with the end of the driving-lever, all operatively combined in the manner and for the purpose set forth.

2. As an improvement in animal-traps, the combination with a suitable anchoring-support, of an actuating-lever pivoted thereon; arms secured to the end of said lever and designed to strike into the burrow of the animal; a shoulder formed upon the opposite end of the actuating-lever; a driving-lever journaled upon said support and having springs so disposed that the outer end thereof will be normally directed downward when the lower end thereof is released from engagement with said shoulder, and a pivoted arm carrying a spear upon its free end, adjustably secured to the outer end of the driving-lever, whereby the end of the spear may be directed to a desired point, substantially as specified and for the purpose set forth.

3. In animal-traps, the combination of a frame having a vertical ear, a slotted actuating-lever pivoted on said ear, said lever carrying on its end a trigger mechanism, a driving-lever pivoted in the frame and carrying an impaler, and means to actuate the driving-lever, as set forth.

4. In animal-traps, the combination of a frame, a driving-lever pivoted in the frame and carrying an impaler, an actuating-lever pivoted in said frame and carrying an adjustable sleeve, and devices connecting the trigger to said sleeve, said levers being locked together, and means to actuate the impaling-lever when set free, all arranged as set forth.

5. In animal-traps, the combination of a frame, a driving-lever carrying an impaler adjustably pivoted thereto, an actuating-lever carrying an adjusting device and a trigger attached thereto, both levers being pivoted in the frame and coöperatively connected, all arranged as set forth.

In testimony whereof I affix my signature in presence of two witnesses.

JOHN A. COOPER.

Witnesses:
T. A. MORSE,
H. L. ROSS.